United States Patent [19]
Lee

[11] Patent Number: 5,815,479
[45] Date of Patent: Sep. 29, 1998

[54] DOOR ASSEMBLY FOR OPTICAL DRIVER

[75] Inventor: Young-Pyo Lee, Seoul, Rep. of Korea

[73] Assignee: Samsung Electronics Co., Ltd., Kyungki-Do, Rep. of Korea

[21] Appl. No.: 715,876

[22] Filed: Sep. 19, 1996

[30] Foreign Application Priority Data

Nov. 20, 1995 [KR] Rep. of Korea ................. 42263/1995

[51] Int. Cl.⁶ .................................................. G11B 33/02
[52] U.S. Cl. .......................................................... 369/77.2
[58] Field of Search ................................. 369/75.1–75.2, 369/77.1–77.2, 99.02, 99.06, 96.5, 96.6; 360/96.5, 96.6, 85

[56] References Cited

U.S. PATENT DOCUMENTS

| | | | |
|---|---|---|---|
| 4,673,994 | 6/1987 | Hida | 360/85 |
| 4,847,711 | 7/1989 | Inoue | 360/96.5 |
| 5,351,228 | 9/1994 | Kanno et al. | 360/99.06 |

*Primary Examiner*—Allen T. Cao
*Attorney, Agent, or Firm*—Sughrue, Mion, Zinn, Macpeak & Seas, PLLC

[57] ABSTRACT

A door assembly of an optical driver that is effective to keep out the influx of dust and other external impurities, and also can be easily installed, closed, and opened. The door assembly, for an optical driver which uses a caddy holding one of a cartridge, a tape, a cassette tape, or a disk, includes: a first door hingedly mounted on a front cover of the optical driver and which is opened only in a direction in which the caddy is ejected; and a second door hingedly mounted on an interior of the first door, the second door being opened in an inward direction within the optical driver only when the caddy is inserted. The second door and the first door are automatically opened and closed according to insertion and ejection, respectively, of the caddy.

6 Claims, 4 Drawing Sheets

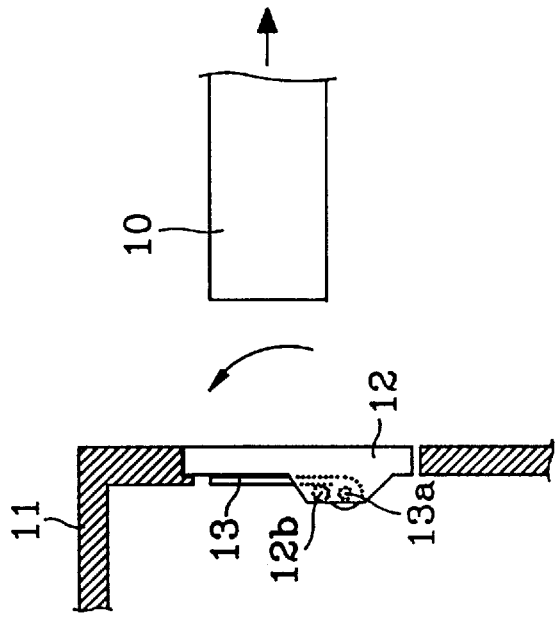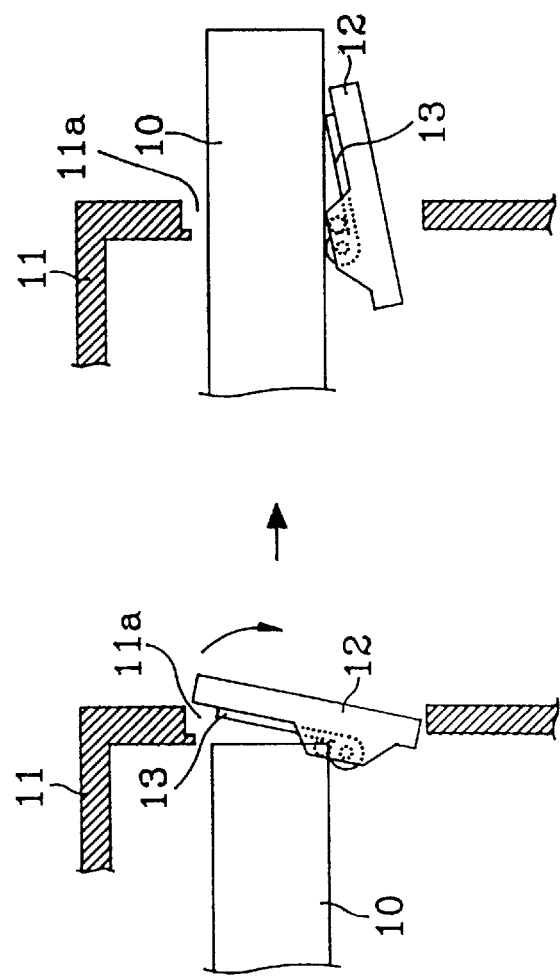

DOOR ASSEMBLY FOR OPTICAL DRIVER

BACKGROUND OF THE INVENTION

1. Field of the Invention

The present invention relates to a door assembly for an optical driver and, in particular, to a door assembly, for an optical driver, that allows a caddy which carries one of a cartridge, a tape, a cassette tape, a disk, etc. to be easily loaded and unloaded while preventing the influx of dust into the optical driver.

The present application for a door assembly of an optical driver that allows a caddy carrying one of a cartridge, a tape, a cassette tape, a disk, etc. to be easily loaded and unloaded while preventing the influx of dust into the optical driver, is based on Korean Application No. 42263/1995.

2. Description of the Related Art

Generally, a prior art door assembly of an optical driver, as shown in FIGS. 1 and 2 or FIG. 3, is constituted with a hole 1a formed on a front cover 1 of the optical driver so that a caddy 2 containing a recording media can be freely loaded and unloaded without difficulty, and a door 3 hinged with a torsion spring on an inner upper portion of the hole 1a, for performing an opening and closing operation. In the prior art door assembly constructed as described above, if the caddy 2 is pushed into the hole 1a, the door 3 moves in a direction where the caddy 2 is pushed. After that, based on the detection of a detecting device mounted therein, the caddy 2 continuously moves into an interior of the optical driver so as to be operated by a transferring device. At this time, the door 3 is half open because it is resting on one end of the caddy 2. Also, in this state, if an eject button is pressed down, the transferring device is reversely loaded, thereby carrying the caddy 2 out. Thus, if the caddy 2 is completely removed from the optical driver, the door 3 is intactly closed by the torsion spring, so as to block the hole 1a.

In the prior art door assembly for an optical assembly as mentioned previously, since the door is not completely closed after loading of the caddy 2 and accordingly partially open after the caddy is inserted into the optical driver, dust or other impurities can get into the optical driver through a crack of the hole. Therefore, it results in a problem in that dust or other impurities can have a bad influence on the pickup, electronic parts, etc., as well as a disk.

FIG. 3 shows another prior art door assembly when a caddy is completely loaded, which is to overcome the above drawbacks. Like the construction of FIG. 1, FIG. 3 is comprised of: a front cover 1 having a hole FIG. 3 is comprised of: a front cover 1 having a hole 1a as illustrated in FIG. 1; a door 3 hinged on the front cover 1; and an additional door-opening device (not shown) for opening the door 3 as when the caddy 2 is loaded or unloaded. In this case, if the caddy 2 is pushed into the hole 1a, the door 3 moves in a direction in which the caddy 2 is pushed. Following that, the caddy 2 continuously moves into an interior of the optical driver so as to be operated by the transferring device. At this time, while the caddy 2 is completely inserted into the optical driver, the door 3 is perfectly closed. Further, in this state, if the eject button is pressed down to eject the caddy 2, the door-opening device opens the door 3 and the transferring device is reversely loaded, thereby ejecting the caddy 2. Therefore, when the caddy 2 is totally removed from the optical driver, the door 3 is intactly closed by the torsion spring to, thereby block the hole 1.

The other prior art door assembly as described above, is effective to keep out dust, but it needs an additional door-opening driver. However, because the external dimension of the driver is standardized, the optical driver must mount the additional door-opening driver to be separated from the optical driver. Therefore, it requires more parts and complicated inner designing space.

SUMMARY OF THE INVENTION

It is accordingly an object of the present invention to provide a door assembly, for an optical driver, that is effective to keep out the influx of dust and other external impurities, and which also can be easily installed, closed, and opened.

The above object according to the present invention can be accomplished with a door assembly of an optical driver, the optical driver including a front cover having an opening therein, and a caddy for holding one of a cartridge, a tape, a cassette tape, and a disk, the door assembly comprising: a first door hingedly mounted on the front cover of the optical driver so as to openably close the opening, the first door being opened only in a direction in which the caddy is ejected, the first door having an insertion hole formed therein for inserting the caddy; and a second door hingedly mounted on an interior of the first door so as to openably close the insertion hole, the second door being opened in an inward direction within the optical driver only when the caddy is inserted, wherein the second door and the first door are automatically opened and closed according to insertion and ejection, respectively, of the caddy, thereby to prevent an influx of dust and other impurities through the opening and into the optical driver.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 7A, 7B and 7C show the operation of the door assembly according to the present invention during unloading of the caddy.

DETAILED DESCRIPTION OF THE PREFERRED EMBODIMENT

Figure 1:
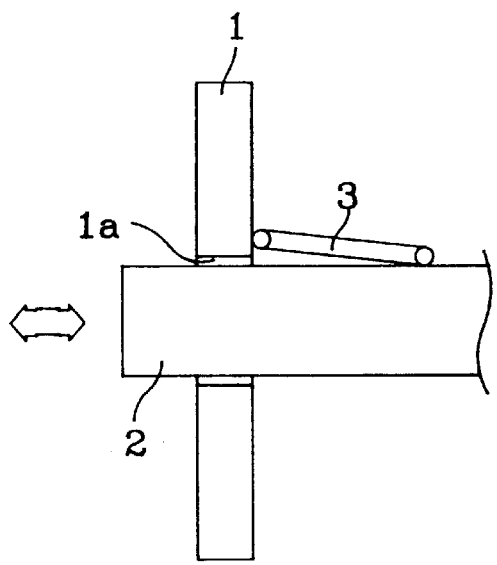
FIG. 1 is a view illustrating the construction of a prior art door assembly.
Figure 2:
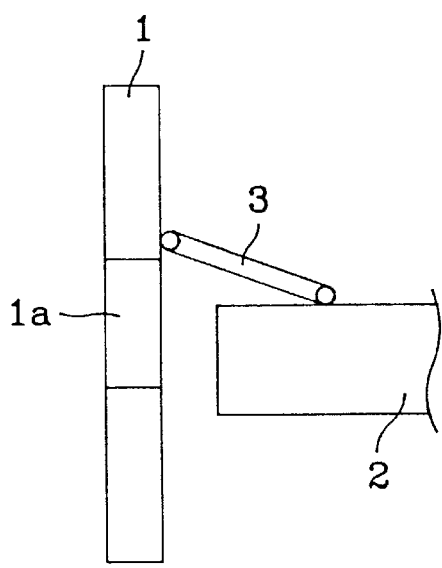
FIG. 2 shows a door assembly of FIG. 1 when a caddy is completely loaded.
Figure 3:
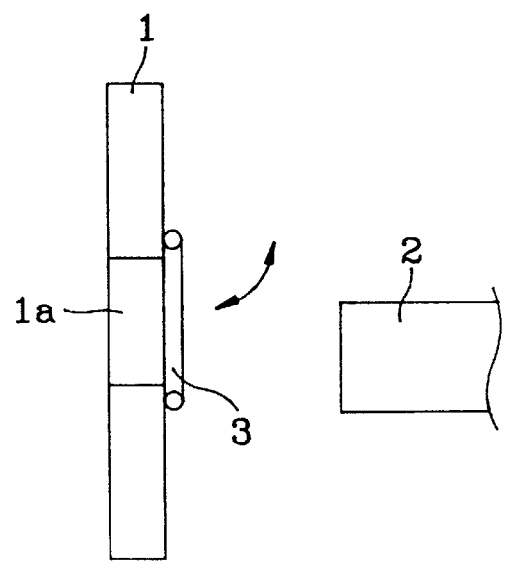
FIG. 3 shows another prior art door assembly when a caddy is completely loaded.

Throughout the drawings, it is noted that the same reference characters will be used to designate like or equivalent elements having the same function.

The detailed description of known functions and constructions unnecessarily obscuring the subject matter of the present invention will be avoided in the present invention. It will be apparent, however, to one skilled in the art that the present invention may be practiced without these specific details.

Figure 4:
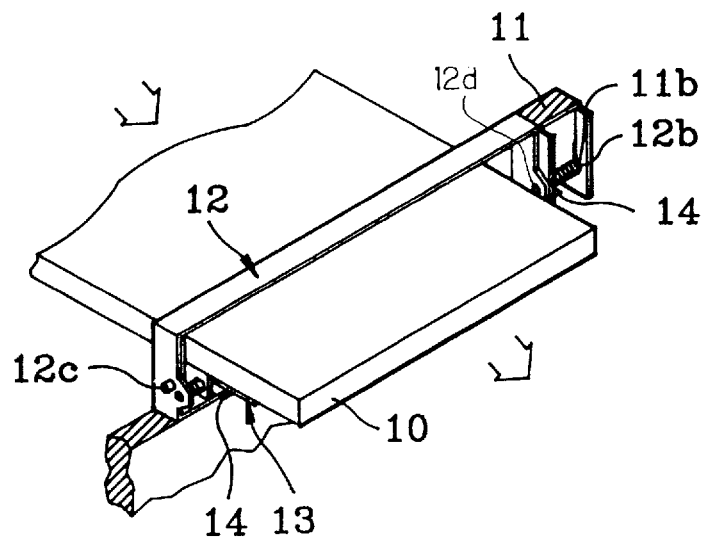
FIG. 4 is a view illustrating the construction of a door assembly according to the present invention.
Figure 5:
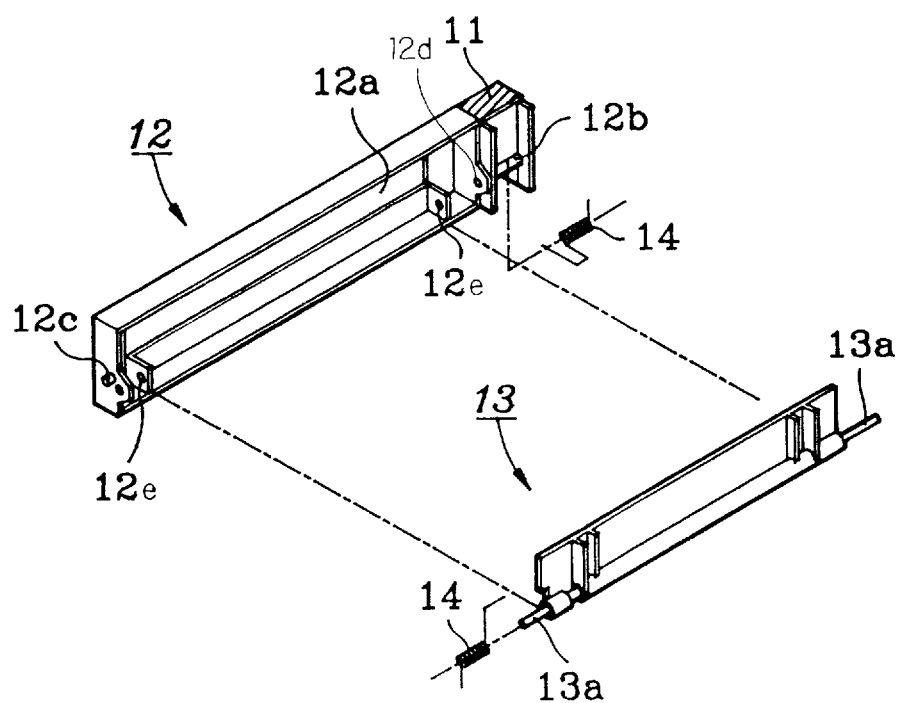
FIG. 5 is an exploded perspective view of the door assembly shown in FIG. 4.
Figure 6C:
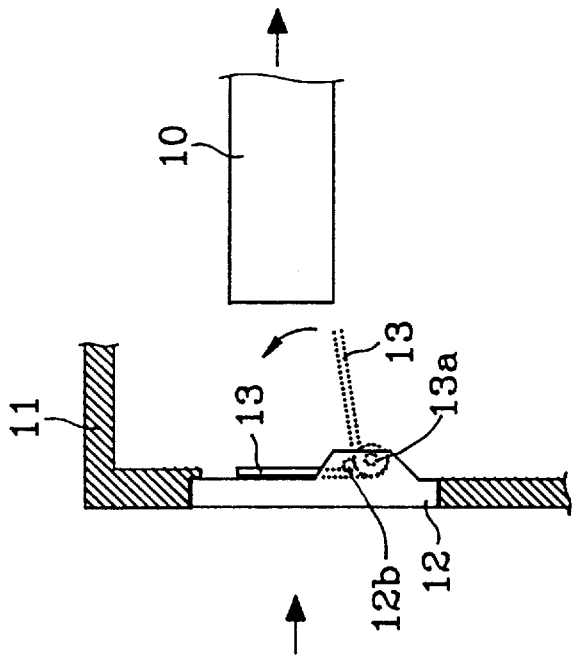
FIGS. 6A, 6B and 6C show the operation of the door assembly according to the present invention during loading of a caddy.
Figure 6B:
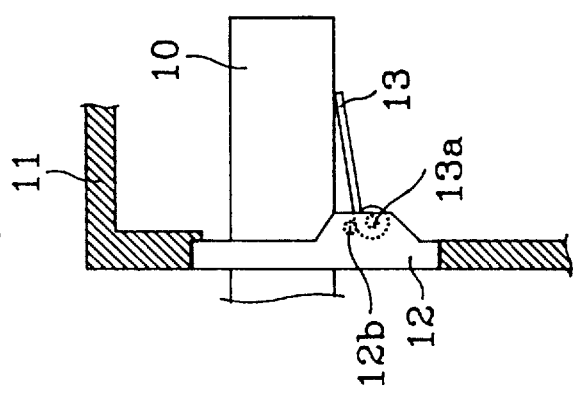
Figure 6A:
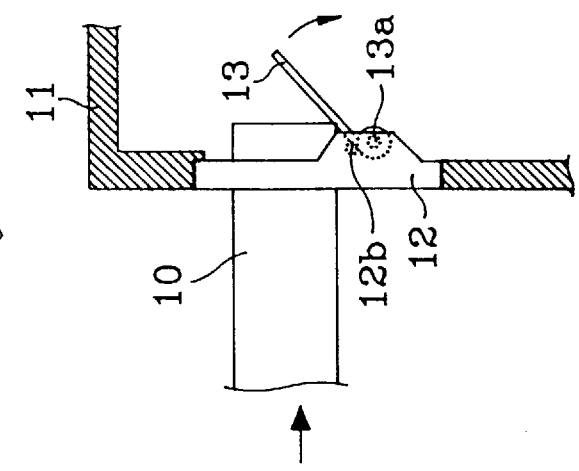

FIGS. 4–7C show a door assembly for an optical driver according to the present invention. The optical driver includes a caddy 10 which contains a recording media, a front cover 11 having an opening 11a therein (see FIGS. 7A and 7B) to place an outer door 12 thereat, and a pin hole 11b to mount the outer door 12 at one portion thereof. The door assembly includes the outer door 12 having an insertion hole 12a for inserting the caddy 10 on the front portion thereof, a pin 12b for being hinged on one side thereof, a boss 12c for holding the outer door 12 on the other side thereof, and a pin hole 12d formed at the one side of the outer door 12 in axial alignment with the boss 12c, for fixing the pin 12b, thereby being capable of being rotated at the opening 11a of the front cover 11 for the purpose of ejecting the caddy 10. The door assembly further includes an inner door 13 having pins 13a on both sides which are inserted into corresponding pin holes 12e of the outer door 12, thus to enable its rotation; and torsion springs 14 engaged with the pin 12b of the outer door 12 and at least one of the pins 13a of the inner door 13, for applying a force in a direction such that the doors 12 and 13 are normally biased closed.

The operation and effect of the door assembly of the present invention will now be described more concretely with reference to FIGS. 6A–7C.

If the caddy 10 is pushed into the insertion hole 12a of the outer door 12 (see FIG. 6A), the inner door 13 pivots about the pins 13a mounted to the outer door 12 and thus opens inward. In this case, while the outer door 12 does not move inwardly in the direction in which the caddy 10 is inserted because the upper portion of the outer door 12 is blocked by the front cover 11, only the inner door 13 pivots and opens. Consecutively, when the caddy 10 is perfectly inserted by loading of the transferring device (not shown), the inner door 13 is intactly closed due to the force of the torsion spring 14 at the pin 13a (see FIG. 6C).

Further, in the case of ejecting the caddy 10 as shown in FIGS. 7A–7C, the transferring device (not shown) is reversely operated, thereby transferring the caddy 10 toward the outer and inner doors 12 and 13.

Once the caddy 10 being carried by the force of the transferring device pushes the inner door 13, the inner door 13 cannot be opened outwardly in a direction where the caddy 10 is ejected, due to the hinge connection to the outer door 12. Finally, the outer door 12 is pushed by the force and pivots on the hinge portion, thereby being opened. At this stage, as soon as the caddy 10 is removed completely from the optical driver (see FIG. 7C), the outer door 12 is intactly closed by the force of the torsion spring 14 at the pin 12b of the outer door 12.

As may be apparent from the foregoing, the inner structure upon designing the door assembly according to the present invention becomes simpler because it does not need an additional door-opening device in ejecting the caddy, and increases the reliability and the lifetime of the driver because the hole is completely closed, thereby eventually preventing the influx of dust and other impurities.

While there has been illustrated and described what is considered to be a preferred embodiment of the present invention, it will be understood by those skilled in the art that various changes and modifications may be made, and equivalents made be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A door assembly of an optical driver, the optical driver including a front cover having an opening therein, and a caddy for holding one of a cartridge, a tape, a cassette tape, and a disk, said door assembly comprising:

a first door hingedly mounted on the front cover of the optical driver so as to openably close the opening, said first door being opened only in a direction in which the caddy is ejected, said first door having an insertion hole formed therein for inserting the caddy; and a second door hingedly mounted on an interior of said first door so as to openably close said insertion hole, said second door being opened in an inward direction within the optical driver only when the caddy is inserted, wherein said second door and said first door are automatically opened and closed according to insertion and ejection, respectively, of the caddy, thereby to prevent an influx of dust and other impurities through the opening and into the optical driver.

2. The door assembly as recited in claim 1, wherein the front cover includes a pin hole at one side thereof to mount said first door.

3. The door assembly as recited in claim 1, further comprising a pin for being hinged on one side of said first door, a boss formed on an opposite side of said first door, a pin hole formed on the one side of said first door for inserting said pin, and a torsion spring disposed about said pin so as to normally bias said first door to close said opening of the front cover.

4. The door assembly as recited in claim 3, wherein said first door is installed to open outwardly together with said second door by ejection of the caddy, and further so that the opening in the front cover can be closed by the force of said torsion spring after completing the ejection of the caddy.

5. The door assembly as recited in claim 1, wherein said second door has pins formed on both sides and which are inserted into corresponding pin holes of said first door, and further comprising a torsion spring mounted with respect to at least one of the pins so that said second door is installed with said torsion spring to be rotated according to an insertion force of the caddy when the caddy is inserted into the optical driver.

6. The door assembly as recited in claim 5, wherein said second door is installed at an interior of said first door thus to open inwardly by the insertion force of the caddy, so that said insertion hole of said first door is closed by said second door due to the force of said torsion spring after completing the insertion of the caddy.

\* \* \* \* \*